United States Patent [19]

Müller

[11] 4,423,859
[45] Jan. 3, 1984

[54] IMPACT DAMPER

[75] Inventor: Rudolf M. R. Müller, Frankfurt am Main, Fed. Rep. of Germany

[73] Assignee: Profil-Verbindungstechnik GmbH & Co. KG, Fed. Rep. of Germany

[21] Appl. No.: 329,412

[22] Filed: Dec. 10, 1981

Related U.S. Application Data

[63] Continuation of Ser. No. 169,169, Jul. 15, 1980, abandoned.

[30] Foreign Application Priority Data

Jul. 17, 1979 [DE] Fed. Rep. of Germany ....... 2928777

[51] Int. Cl.$^3$ .............................................. F16F 7/00
[52] U.S. Cl. .................................... 267/119; 267/130; 267/124; 267/64.26; 267/140; 267/141
[58] Field of Search .................... 188/321.11, 297, 229, 188/322.16, 322.17, 322.18, 322.19, 269; 267/130, 119, 124, 137, 64.26, 141, 140, 153

[56] References Cited

U.S. PATENT DOCUMENTS

| | | | |
|---|---|---|---|
| 1,576,152 | 3/1962 | Staats-Oels | 267/64.11 |
| 2,791,094 | 5/1957 | Opitz | 267/119 |
| 2,939,696 | 6/1960 | Tuczek | 188/269 |
| 3,180,634 | 4/1965 | Heiser | 267/119 |
| 3,228,638 | 1/1966 | Burch | 267/119 |
| 3,499,505 | 3/1970 | DeCarbon | 188/322.18 |
| 4,005,763 | 2/1977 | Wallis | 267/119 |

FOREIGN PATENT DOCUMENTS 23669 9/1962 Fed. Rep. of Germany ... 267/64.26

Primary Examiner—Galen L. Barefoot
Assistant Examiner—Thomas J. Brahan
Attorney, Agent, or Firm—Cullen, Sloman, Cantor, Grauer, Scott & Rutherford

[57] ABSTRACT

An impact damper for use, for example, between the stationary and reciprocating parts of a stamping machine to reduce the noise produced at the end of each stamping operation, consists of a two-stage telescopic gas pressure cylinder 10. A base 3 of the cylinder is fixed on the stationary part of the machine and the head 33 of an internal piston 14 is in permanent engagement with the reciprocating part 6. As the part 6 moves downwards, the piston 14 is retracted, but at first an external piston 13 remains stationary. There is therefore a small resistance to movement of the part 6. As the part 6 approaches the end of its downward movement at which noise is generated at the end of a stamping operation, the head 33 engages a ring 34 at the upper end of the external piston 3 so that the external piston also then starts to be retracted. The resistance to downwards movement is thus greatly increased as both the effective piston area and the gas pressure within the cylinder increase and thus the end part of the movement of the part 6 is cushioned.

7 Claims, 5 Drawing Figures

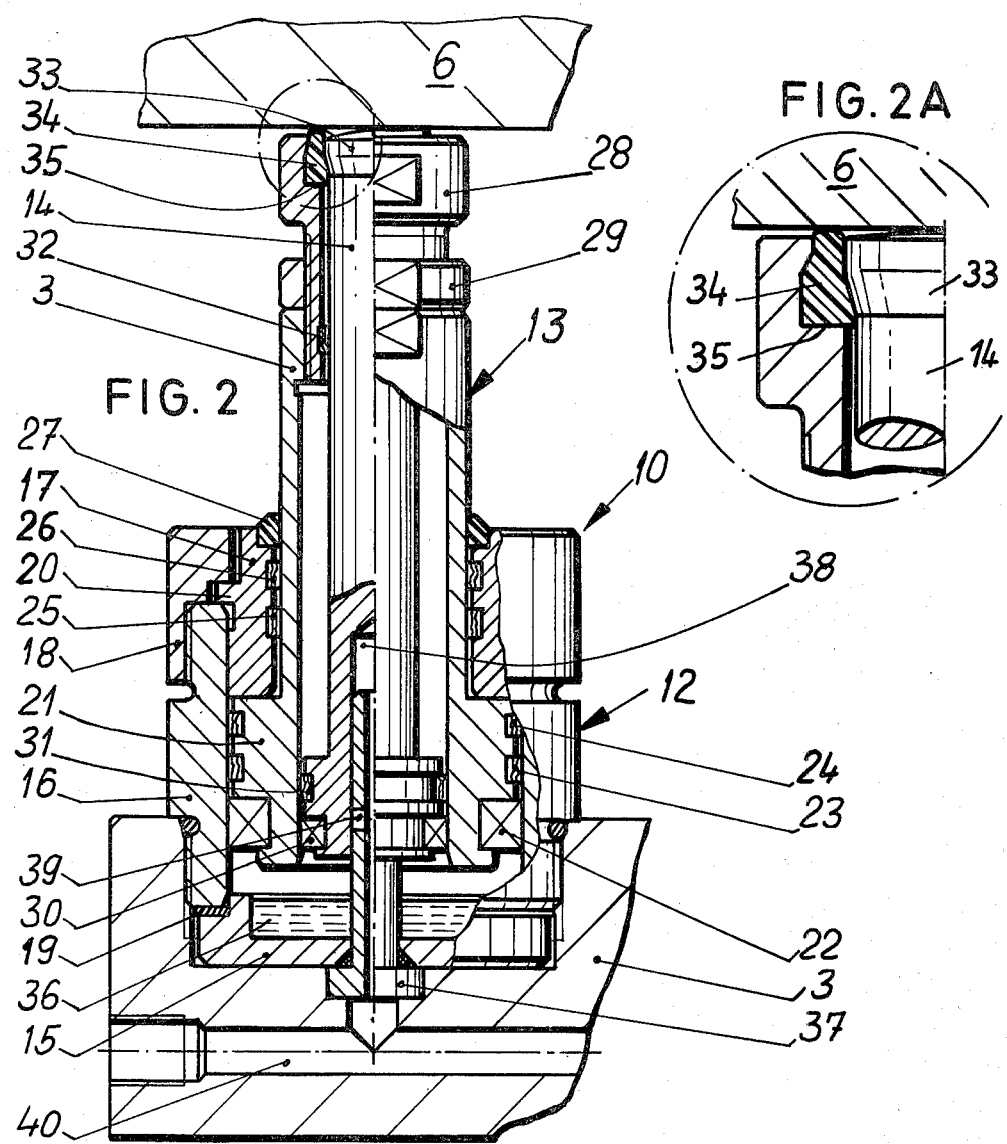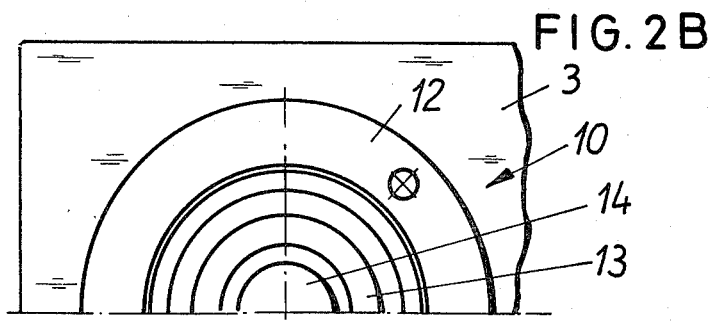

IMPACT DAMPER

This is a continuation of application Ser. No. 169,169 filed on July 15, 1980 now abandoned.

This invention relates to impact dampers for producing a graded spring resistance with a precisely defined spring characteristic, for reducing the noise of machines with reciprocating or oscillating machine parts, for example machine tools such as forming, shearing and stamping machines. The impact damper comprises a telescopic cylinder which is filled with a damping fluid and, in use, acts between the moving and the stationary machine parts.

Such impact dampers are used particularly for damping the impact noise generated by stamping and shearing machines but also in other machines with reciprocating or oscillating machine parts. In such machine tools, impact noise is generated mainly by the sudden freeing of the moving machine parts on completion of the shearing or stamping operation. Such sudden freeing also results in high mechanical stresses being imposed on the machine components.

Impact dampers are disposed between the moving and stationary machine parts in order to reduce the impact noise and stresses and such dampers are constructed as hydro-pneumatic or purely hydraulic cylinders with a complex system of pilot control or external control (see German Auslegeschrift No. 22 48 024) and can therefore be adjusted to provide damping at the required instants and with the required resistance only with very low precision and with the expenditure of a large amount of time. Furthermore, the imcompressibility of oil prevents smooth retardation of the freed machine part, so that the noise reduction is unsatisfactory. Furthermore, additional noise is produced by the impact of the moving machine parts on the pistons of the cylinders. It is perfectly feasible for such noise to be of the same order of magnitude as the noise caused by the machine itself.

It is the object of the present invention to provide an impact damper of the kind described above with substantially improved damping characteristics and in particular with a more effective noise damping action.

According to this invention, such an impact damper comprises a telescopic cylinder which contains gas under pressure and is arranged to act between the relatively movable machine parts, the telescopic cylinder having at least two stages and comprising a cylinder casing, an external annular piston slidable in the casing, and at least one internal piston which is slidable in the external piston, whereby, in operation, when the two machine parts move towards each other, initially the at least one internal piston slides in the external piston while the external piston remains stationary and subsequently the external piston slides in the casing, partaking of the movement of the at least one internal piston.

With this construction, the impact damper can be installed between the moving and stationary machine parts so that its internal piston bears permanently on the moving part of the machine during its entire operating motion. Because of the smaller piston area of the internal piston, and by virtue of the cylinder gas volume, which is still large at that time, the spring action of the damper leads to only a slight resistance so that practically no driving energy of the moving part is lost. It is only when the external piston is also moved, which happens immediately after the machine operation when the moving part is freed, that, as the result of the substantially increased effective piston surface area of both the internal and external pistons acting together and because of the substantially reduced gas volume in the cylinder at this time, that an incomparably larger resistance is produced which absorbs the noisy impact of the moving machine part.

Owing to the gas charge in the cylinder, the increase in resistance takes place relatively smoothly so that effective noise reduction is obtained in addition to protection of the machine parts against excessive stresses. An inert gas, for example nitrogen, is preferred as a charge for the cylinder.

In one embodiment of the invention, the outer end of the external piston has a stop which is engaged by the internal piston as the internal piston slides into the external piston, the stop being formed of impact damping material. In this way, the impact noise at the beginning of operation of the external piston is substantially reduced.

In a particularly advantageous embodiment, the stop is fitted in an internal recess in the end of the external piston and consists of a resilient ring in the recess, and the internal piston has a widened portion which engages the resilient ring as the internal piston moves inwards. The transition of the internal piston to the widened portion is preferably conical. By virtue of this construction, the ring in the recess is substantially radially compressed by the conical widened portion in the course of the inward movement of the internal piston. This results in a particularly low-noise entrainment of the external piston in the movement of the internal piston. The recess preferably narrows slightly towards the outer end of the external piston to prevent the resilient ring from being pushed out of the recess in the outward direction.

The outer end of the external piston is advantageously provided with an adjustable portion to enable the position of the outer end relative to the casing, when the external piston is extended, to be adjusted. In this way the commencement of movement of the external piston can be optimally adapted to requirements. This can be achieved by constructing the adjustable portion as an externally screw-threaded sleeve which is screwed into the remaining part of the outer piston. Vertical adjustment can then be obtained by rotation of the sleeve. Conveniently, the sleeve is also constructed as a guide sleeve for the internal piston. A stop nut in the form of a polyamide ring can be provided to prevent unintentional rotation of the sleeve.

There is preferably an oil cushion in the inner end of the cylinder. This cushion is advantageously made of expanded rigid plastics material which is filled with oil. Owing to the pumping effect caused by the operating movements of the pistons, the oil cushion produces an oil mist in the cylinder to ensure adequate lubrication of the moving parts. The oil cushion also functions as a safety stop in the event of unintentional over-running of the intended length of stroke of the pistons.

The cylinder of the impact damper can be provided with a sealed gas charge. By providing both pistons with suitable seals it is possible reliably to prevent the escape of gas and thus any reduction in the damping effect. The internal chamber of the cylinder may however alternatively be connected to a reservoir of gas under pressure by means of a gas supply tube extending through the base of the cylinder, so that full functioning of the impact damper is ensured over a prolonged period even in the event of slight leakage due to wear of the piston seals. Then, an end opening of said supply tube fits in a bore in the internal piston so that the opening is closed by moving into the bore when the external piston starts to partake in the movement of the internal piston. This avoids the increase in pressure, generated by the inward movement of the external piston, being returned via the supply tube into the reservoir with a consequent reduction of the reaction force on the pistons.

To avoid damage when the supply tube moves into the bore, it is also preferable that the end opening of the supply tube is so located relative to the bore that the end opening is closed by the bore during the entire movement of the internal and external piston and the tube has a lateral port located such that the port is closed by entering the bore immediately prior to the external piston starting to partake of the movement of the internal piston. The end of the supply tube therefore always remains in the bore so that it is guided by the internal piston.

The construction of the impact damper with a supply tube is particularly convenient if a plurality of impact dampers are situated on a common base plate, the supply tubes of the dampers being connected to each other by means of ducts in the base plate and also being connected to a reservoir containing the gas under pressure. This results in a uniform damping effect by all the impact dampers thus preventing one-sided loads from being imposed on the moving parts of the machine.

As already mentioned, impact dampers in accordance with the invention can be used in many branches of technology and they are not confined to noise suppression although this will necessarily be achieved. The dampers may also be used for absorption of recoil forces and in any machines with reciprocating or oscillating machine parts.

An example of a stamping machine incorporating impact dampers in accordance with the invention will now be described with reference to the accompanying drawings in which:

FIG. 2 is a vertical section to a larger scale through one of the impact dampers incorporated in the machine;

FIG. 2A is a sectional detail to a still larger scale of a part of the impact dampers shown ringed in FIG. 2; and, FIG. 2B is a partial plan view of the impact dampers shown in FIG. 2.

Figure 1:
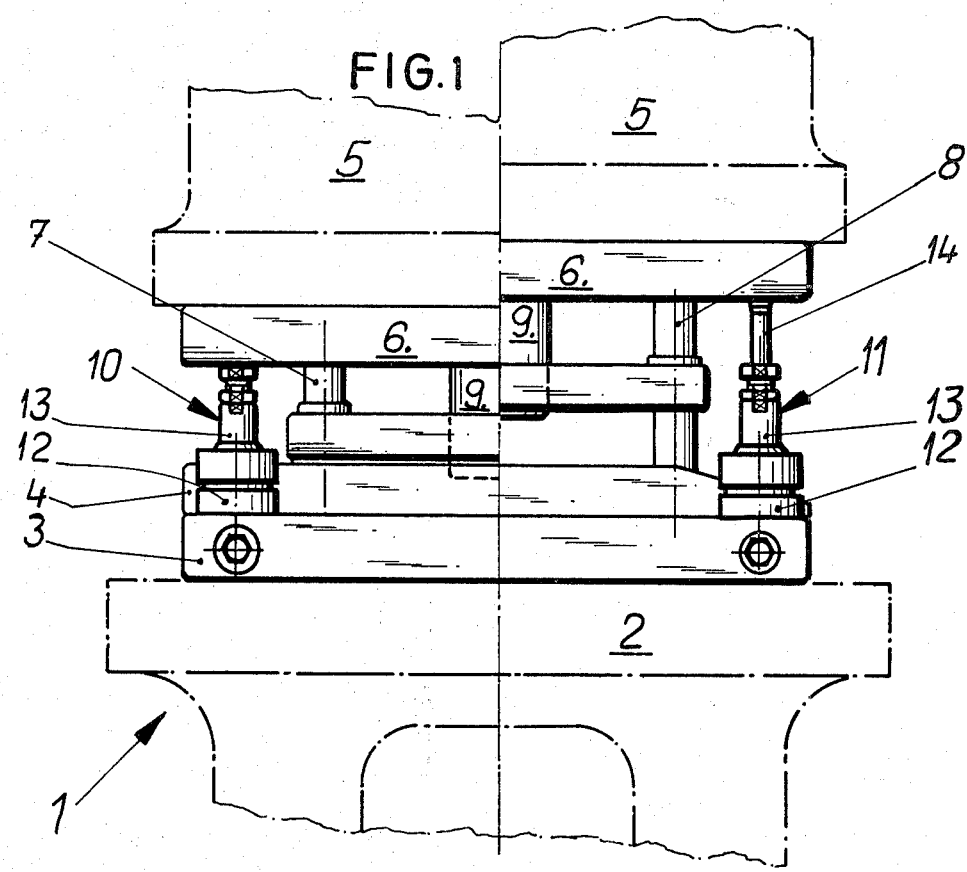
FIG. 1 is a side elevation of part of the stamping machine which is shown to the left of a centre-line in a closed position and to right of the centre-line in an open position.
Figure 1A:
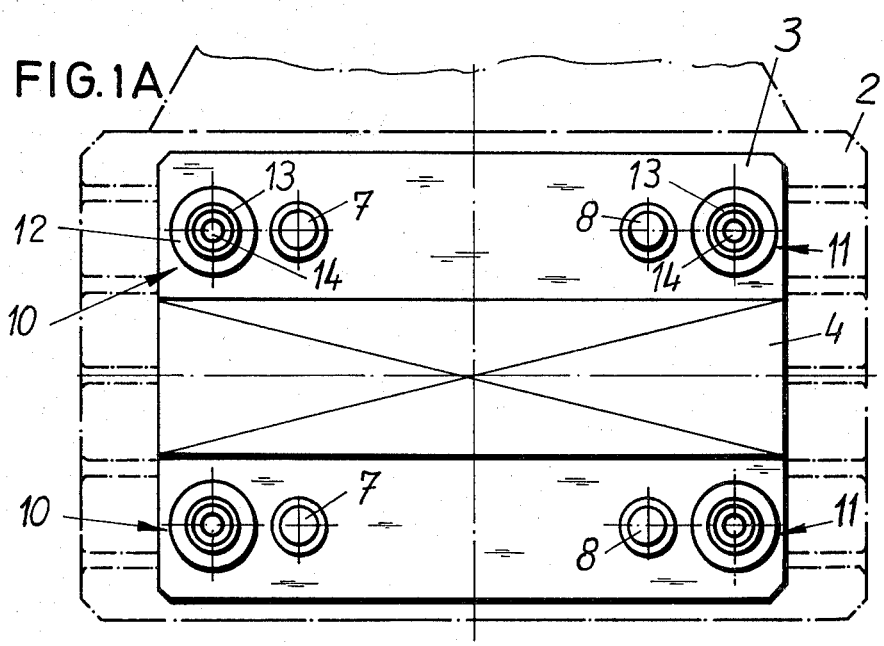
FIG. 1A is a plan view of the lower part of the machine shown in FIG. 1.

FIG. 1 shows a side view of stamping machine 1, the right half of the figure showing the machine in an open position and the left half in a closed position. The machine 1 comprises a machine table 2, a base plate 3, a die plate 4 and a machine ram 5, the underside of which is provided with a head plate 6 and a stamping punch 9, which is retained by means of guide columns 7, 8.

Impact dampers 10, 11 are disposed one in each corner between the base plate 3 and the head plate 4. The purpose of the impact dampers 10, 11 is to smoothly absorb the follow-through of the moving parts of the machine 1 immediately after completion of the stamping operation and thus to reduce the noise which results from follow-through which is not resiliently absorbed by the workpiece.

As can be seen from the right hand part of FIG. 1, each impact damper 11 is constructed as a two-stage gas pressure cylinder with a cylinder casing 12, an external piston 13 and an internal piston 14, which is guided in the external piston. The internal piston 14 can be extended so that it always bears on the head plate 6 and therefore no impact noises can occur between these two parts.

The externally disposed top end of the external piston 13 projects from the cylinder casing 12 only by a distance which is such that the piston is directly forced downwards by the descending machine ram 5 only immediately after completion of the stamping operation, as shown in the left hand half of FIG. 1. Jointly with the internal piston 14, the external piston is then engaged by the machine ram 5 and thus prevents noisy follow-through. The internal construction of the impact damper 10 is shown in partial vertical section in FIG. 2. As already mentioned, the main parts of the impact damper 10 comprise the cylinder casing 12, the external piston 13 and the internal piston 14.

The cylinder casing 12 comprises four parts, namely a cylinder base 15, a cylinder wall 16, a stroke limiting collar 17 and an adapter collar 18. The bottom end of the cylinder wall 16 is screwed into a recess in the base plate 3 (see also FIG. 1) and in this way holds the cylinder base 15 in position through a seal 19.

The stroke limiting collar 17 extends downwards into the cylinder casing 12 and its bottom edge limits outward resilient movement of the external piston 13 under the action of the gas pressure which prevails in the cylinder casing 12. The stroke limiting collar 17 bears on the top edge of the cylinder wall 16 by means of an annular flange 20 and is retained in position by means of the adapter collar 18, which is screwed on to the outside of the cylinder wall 16.

At its bottom end the external piston 13 has a stepped, broadened portion 21 which extends below the stroke limiting collar 17. The portion 21 is provided with a total of three ring seals 22, 23, 24 which prevent escape of the nitrogen under pressure in the internal chamber of the cylinder casing 12. The stroke limiting collar 17 is provided with two additional ring seals 25, 26. In addition to performing a sealing function, the ring seals 22 to 26 also perform the function of guiding the external piston 13. A stripper collar 27 functions as a dirt stripper to prevent the ingress of foreign matter into the guiding and sealing region of the external piston 13.

The top part of the external piston 13 is constructed as a guide sleeve 28 for the internal piston 14. The guide sleeve 28 is vertically adjustably screw-mounted in the bottom part of the external piston 13, so that the position in the stroke of the machine ram 5 or its head plate 6, at which the ram 5 or the head plate 6 engages the external piston is adjustable. After being adjusted, the preset height of the guide sleeve 28 can be fixed by means of a lock nut 29, which is advantageously self-locking so that the height cannot change in operation of the machine.

The internal piston 14 is guided in the external piston 13 by means of ring seals 30, 31 at its bottom end by means of a further ring seal 32 in the guide sleeve 28. The top end of the internal piston 14 has a conically flared widened portion 33. In the course of the damping action, the thickened portion 33 bears upon a damping collar or stop means 34 or resilient material which is inserted in a recess 35 disposed on the inside of the guide sleeve 28. The damping collar 34 smoothly absorbs the final part of the downward movement of the internal piston 14 and transfers it to the external piston 13 without any impact stresses so that the external piston takes up the ensueing damping action. The head plate 6 does not come into contact with the guide sleeve 28 and therefore also does not come into contact with the external piston 13 so that no impact noise can be produced. The recess 35 narrows slightly towards the top end to prevent the damping collar 34 from being pushed out of the recess in an upward direction.

An oil cushion 36, made of rigid expanded plastics material filled with oil, is recessed into the cylinder base 15 and produces an oil mist as a result of the pumping action produced by the reciprocating motions of the external and internal pistons 13, 14. This oil mist constantly lubricates the moving parts.

The impact damper can be constructed as a totally enclosed system in which the internal chamber of the cylinder casing is completely sealed from the outside. However, if a plurality of impact dampers 10, 11 are provided as in this example, it is convenient to interconnect the internal chambers of the cylinder casings 12 in order to obtain pressure equalization and therefore to obtain a uniform damping action from all the dampers. To this end, the illustrated impact damper 10 is provided with a supply tube 37 which extends through the cylinder base 15 and has an open end sufficiently high to project into a central bore 38 in the internal piston 14. The supply tube 37 has lateral ports 39, arranged at a height which is such that, although they are open when the internal piston 14 is extended, during the inward resilient damping movement the wall of the bore 38 traverses and seals the ports 39 immediately prior to the external piston 13 being engaged by the head plate 6. In this way, the gas under high pressure produced during the damping movement of the external piston 13 cannot escape via the supply tube 37.

The supply tube 37 communcates via ports 40 in the base plate 3 with the supply tubes of the other impact dampers 10, and with a reservoir of gas under pressure (not shown).

The resilient damping movement of the impact damper 10 takes place in two stages. For as long as only the internal piston 14 is engaged by the head plate 6, the resistance of the damper will be low because of the relatively small effective area of the internal piston 14 and because at this time the internal volume of the damper is still relatively large and the gas in it is only slightly compressed so that practically no driving energy is lost from the plate 6. It is only when the internal piston 14 bears upon the damping collar 34 and thus entrains the external piston 13 in the course of further motion, that the damping characteristic of the impact damper 10 becomes harder as a result of the total effective piston surface area being now substantially larger and because of the gas pressure then being substantially higher. This harder characteristic commences when the moving machine parts of the stamping machine 1 begin to move more freely on completion of the stamping operation so that it is necessary for large forces to be absorbed. Adjustment of the time at which the harder characteristic starts is obtained, as already mentioned, by means of the vertical adjustment of the guide sleeve 28.

The resistance curve characteristic of the impact damper 10 can be influenced within wide limits by appropriate dimensioning of the two effective piston areas, both in absolute and relative terms, and also by the initial gas pressure within and the available material volume of the cylinder case 12. Optimum adaptation of the impact damper 10 to all requirements is thus made possible.

I claim:

1. An impact damper for producing a graded spring resistance for reducing noise in a machine having a stationary member and a reciprocating impact member, comprising: an external casing having a base engaging said stationary member of said machine and a telescopic cylinder normally engaging said reciprocating member of said machine, said telescopic member including an internal piston having a head engaging said reciprocating machine member and an external piston having an internal bore telescopically receiving and guiding said internal piston, said internal piston having an end portion adjacent said casing base in sealed relation within said external piston bore, said casing enclosing the end portion of said external piston adjacent said base in sealed relation, and said casing including an enclosed gas chamber located between said piston end portions and said casing base, and a resilient stop means on said external piston limiting telescopic movement of said internal piston, relative to said external piston, said stop means comprising a resilient annular collar located in an annular recess in said external piston bore adjacent said internal piston head, and said internal piston head having an enlarged end portion engaging said resilient collar and stopping telescopic movement of said internal piston, relative to said external piston toward said casing base, whereby the initial movement of said reciprocating machine member telescopes said internal piston within said external piston bore, while said external piston remains stationary until said internal piston engages said resilient stop means, causing said internal and external pistons to telescopically move together with said casing, providing said graded spring resistance and reducing the impact noise of said machine.

2. The impact damper defined in claim 1, characterized in that said external piston recess is located within the end of said external piston bore adjacent said internal piston head, said annular recess having a radially inwardly projecting annular end portion entrapping said resilient collar and said internal piston head enlarged portion having a conical flared portion facing said resilient collar.

3. An impact damper for producing a graded spring resistance for reducing noise in a machine having a stationary member and a reciprocating impact member, comprising: an external casing fixed relative to said stationary member of said machine and a telescopic cylinder normally engaging said reciprocating member of said machine, said telescopic member including an internal piston having a head engaging said reciprocating machine member and an external piston having an internal bore telescopically receiving and guiding said internal piston, said internal piston having an end portion adjacent said casing in sealed relation within said external piston bore, said casing enclosing the end portion of said external piston in sealed guided relation, said casing including an enclosed gas chamber located between said piston end portions and the base of said casing adjacent said machine stationary member, said internal piston having a central bore opening toward said casing base, and a gas supply tube fixed relative to said casing telescopically extending into said internal piston bore, said gas supply tube communicating with a source of gas and having a lateral port spaced from its distal end, said external piston having a head which engages said reciprocating machine member when said internal piston is substantially fully received within said external piston, said pistons then telescopically moved within said casing under the force of said reciprocating machine member in unison, said gas supply tube port located in said tube such that the port is closed by entering said internal piston bore prior to said internal piston being fully received within said external piston, providing said graded spring resistance.

4. The impact damper defined in claim 3, characterized in that said external piston includes said head and a coaxially aligned tubular main body portion, said external piston head threadably adjustable on said body portion to adjust the travel of said internal piston and the graded spring resistance of said impact damper.

5. The impact damper defined in claim 4, characterized in that said external piston includes a stop means comprising a resilient annular collar located in a recess in said external piston adjacent said internal piston head which receives said internal piston head and stops the movement of said internal piston relative to said external piston.

6. The impact damper defined in claim 3, characterized in that said enclosed gas chamber of said casing includes an oil cushion comprising an expanded rigid plastic material saturated with oil located within said chamber.

7. An impact damping system comrising, in combination, a plurality of impact dampers as defined in claim 3, said impact dampers including a common base and means defining ducts in said base, said supply tubes of each of said impact dampers communicating with each other through said ducts and further comprising a reservoir containing gas under pressure, said reservoir communicating with said ducts.

* * * * *